United States Patent [19]
Linville et al.

[11] Patent Number: 6,026,075
[45] Date of Patent: Feb. 15, 2000

[54] FLOW CONTROL MECHANISM

[75] Inventors: John Walter Linville; Brad Alan Makrucki, both of Durham; Edward Stanley Suffern, Chapel Hill; Jeffrey Robert Warren, Apex, all of N.C.

[73] Assignee: International Business Machines Corporation, Armonk, N.Y.

[21] Appl. No.: 08/806,187

[22] Filed: Feb. 25, 1997

[51] Int. Cl.⁷ .......................... H04J 3/14; H04L 12/413
[52] U.S. Cl. .......................... 370/236; 370/401; 370/445
[58] Field of Search .................... 370/229, 230, 370/231, 232, 233, 234, 235, 236, 240, 398, 401, 445; 395/200.62, 200.63, 200.64, 200.65

[56] References Cited

U.S. PATENT DOCUMENTS

| | | | |
|---|---|---|---|
| 4,736,369 | 4/1988 | Barzilai et al. | 370/94 |
| 5,090,011 | 2/1992 | Fukuta et al. | 370/230 |
| 5,280,470 | 1/1994 | Buhrke et al. | 370/13 |
| 5,359,593 | 10/1994 | Derby et al. | 370/17 |
| 5,367,523 | 11/1994 | Chang et al. | 370/84 |
| 5,381,413 | 1/1995 | Tobagi et al. | 370/85.6 |
| 5,402,422 | 3/1995 | Liu et al. | 370/85.5 |
| 5,426,637 | 6/1995 | Derby et al. | 370/401 |
| 5,434,860 | 7/1995 | Riddle | 370/84 |
| 5,455,826 | 10/1995 | Ozveren et al. | 370/60 |
| 5,495,426 | 2/1996 | Waclawsky et al. | 364/514 |
| 5,519,689 | 5/1996 | Kim | 370/17 |
| 5,533,009 | 7/1996 | Chen | 370/17 |
| 5,673,254 | 9/1997 | Crayford | 370/231 |

FOREIGN PATENT DOCUMENTS

| | | | |
|---|---|---|---|
| 9501029 | 1/1995 | WIPO | H04L 12/56 |

OTHER PUBLICATIONS

IBM Technical Disclosure Bulletin, vol. 37, No. 3, Mar. 1994 "Ethernet Bandwidth Management".

IBM Technical Disclosure Bullentin, vol. 38, No. 8, Aug. 1995 "Method of Flow Control for 100–Mbps Ethernet Adapters".

IEEE, Sep. 5, 1996 "Specification for 802.3 Full Duplex Operation".

*Primary Examiner*—Chau Nguyen
*Assistant Examiner*—Soon-Dong Hyun
*Attorney, Agent, or Firm*—Joscelyn G. Cockburn

[57] ABSTRACT

Data bandwidth on a congested link of a Carrier Sense Multiple Access with Collision Detection (CSMA/CD) network, is controlled by a Pause MAC Frame which carries information identifying devices causing the problem on the link. The Recipient of the Pause MAC Frame can use the information to deactivate selected devices on the congested link. As a consequence, the data bandwidth is reduced without shutting down the link.

24 Claims, 6 Drawing Sheets

FLOW CONTROL MECHANISM

BACKGROUND OF THE INVENTION

1. Field of the Invention

The invention relates to computer networks in general and, in particular, to flow control and congestion management in said networks.

2. Prior Art

The proliferation of computer networks has made network management one of the fastest growing areas of the computer industry. A typical computer network is comprised of some type of communications infrastructure interconnecting a plurality of Personal Computers (PCs) and/or other types of Data Terminal Equipment (DTE). The primary purpose of network management is to design and maintain the network so that it provides optimum service to users of the network.

Flow control and congestion management are factors to be addressed in a well-designed network. If these factors are not properly addressed, the network will not provide optimum service to its users. The expectation for optimum service is even greater as more customer demands for services such as system availability, increased bandwidth, etc., are placed on networks. The prior art has recognized the need for improved services and has provided several teachings regarding flow control and congestion management which will now be addressed.

U.S. Pat. No. 5,280,470 describes bandwidth and congestion management in broadband ISDN networks. The ISDN switch detects the congestion and generates slowdown frames configured in Asynchronous Transfer Mode (AIM) cell format. The cells are sent to slow down selected virtual channels. Even though this type of congestion management appears to work well with AIM protocol, it may not work well with other types of protocol.

U.S. Pat. No. 5,367,523 discloses an Adaptive Rate Base congestion and flow control system wherein rate request and rate response messages are exchanged regularly between data senders and receivers to allow the sender to adjust its data rate to avoid congestion. The frequent exchange of request and response messages tend to consume bandwidth unnecessarily. Consequently, data throughput could be impaired.

U.S. Pat. No. 4,736,369 discloses a technique, termed adaptive session-level pacing, which allows a data receiver to request changing the size of an information window during an active session. The new window size is used in subsequent transfer of information to the data receiver.

U.S. Pat. No. 5,434,860 discloses a flow control methodology in which a data receiver determines a suggested data rate, for a data sender, based in part on a number of data packets lost during a preceding time interval and forwards the suggested rate to the data sender which adjusts its data rate in accordance with the suggested data rate. The technique appears to use higher level software to make the determination.

U.S. Pat. No. 5,455,826 describes a flow control system in which transmitting nodes and receiving nodes are linked together through virtual circuits over a communications link. Each of the virtual circuits are assigned a predetermined amount of bandwidth. If a virtual circuit exceeds its bandwidth allotment, further transmissions on that circuit are disabled for the remainder of the current time period.

PCT published application (Publication Number: WO 95/01029) disclosed a flow control method in which an AIM switch, in an M network, determines when the switch is approaching congested states and sets congested indicators provided for in the payload type field of the standard cell format. The receiving port checks the cells and a message is sent to the source port if the proportion of cells carrying the congested indication on a particular channel is relatively high.

IBM® TDB Vol. 38, No. 3 (page 23, August 1995) discloses a flow control method for a CSMA/CD adapter or ethernet adapter wherein buffer overrun is prevented by sending a dummy frame on the link to cause a collision.

The IEEE STD 802.3X proposes a Pause Control MAC Frame for shutting down (i.e. discontinue data transmission) a link if the link becomes congested. The Pause Frame has a field in which the shutdown time is selected by the entity observing the congestion. Among the many drawbacks with this approach is the fact that it cannot be used on links over which information relative to critical applications or functions are to be transmitted because the shutdown time and reporting of results may occur simultaneously and the critical information could be lost or not reported on time. Either way, such results would be undesirable.

Another drawback with 802.3X is that while an entire link is de-activated, queues begin to back-up on stations that need to transmit on the de-activated link. While de-activating, the link relieves congestion for one station, it causes congestion for (possibly many) other stations.

Accordingly, the prior art does not provide an efficient arrangement or mechanism to manage flow control and/or data congestion in a CSMA/CD or ethernet network. It is this problem the present invention addresses.

SUMMARY OF THE INVENTION

It is, therefore, the general object of the present invention to provide an apparatus and method for managing flow control and/or congestion in a more efficient way than was heretofore been possible.

It is another object of the present invention to provide a transport mechanism which carries information indicating the identity of data receivers and/or data senders causing congestion on a link. By so doing, the problem causing device can be identified and the data output can be adjusted to an acceptable level.

These and other objects of the present invention are achieved by providing a flow control system comprised of a circuit arrangement which monitors Medium Access Control (MAC) devices and generates control signals representative of the congestive state of the MAC devices. A Pause Frame Parsing and Building Unit, in response to the control signals, builds and transmits to a selected entity a pause frame to be used to adjust bandwidth on the link. The bandwidth adjustment is such that the link carries data and is not completely disabled as is suggested by the above referenced standard.

Alternatively, when a MAC device receives a MAC Frame structured according to the teachings of the present invention, depending on the setting of bits in the frame, the Pause Frame Parsing and Building Unit parses the frame and takes appropriate action to adjust data output from stations associated with the receiving MAC devices.

In particular, the pause frame is architectured to the CSMA/CD and ethernet protocols. The pad field of the frame includes a Magic Cookie (to be described below) field and one or more station record fields carrying the identity of stations and/or other network entities causing the congestion.

In particular, the invention uses 42 bytes of Pad Field to carry information for implementing our end-(or middle-)-to end Flow Control Mechanism. The first two of these bytes for a magic number field (0x7698) so that frames received from stations implementing only the link-by-link mechanism will not be interpreted as containing problem-source or problem-destination information. The remaining 40 bytes are divided into five (8 byte) records, each containing a 2 byte information field and a 6 byte MAC address. The information field has one bit indicating whether the entry is valid or invalid, another bit indicating whether it pertains to a source or destination entry, a granularity bit that indicates if the extended duration field should be shifted left one byte. This enables extended values to range from 0–255 in increments of 1 slot time, or 256–65,280 in increments of 256 slot times. For a 100 bps link, this equates to pause times of fine granularity less than or equal to 1.3 msec or a course granularity ranging from 1 nsec to 336 msec. The Information also contains an 8 bit scalar value specifying an additional number of slot times to apply the pause for this MAC address over those specified in the 802.3X standard frame (by the MAC control parameter). The invention can be used in addition to, or not at all, with the link-by-link Flow Control Mechanism described in the 802.3X. These enhancements to the IEEE 802.3X pause frames are non-compliant with the standard; however, it will be interoperable. The remaining five bits (8–12) are currently unspecified and should be considered reserved at this time; i.e., transmitted as 0's.

The foregoing and other objects, features and advantages of the invention are more fully described in the accompanying drawings.

DETAILED DESCRIPTION OF THE PREFERRED EMBODIMENT

Figure 1:
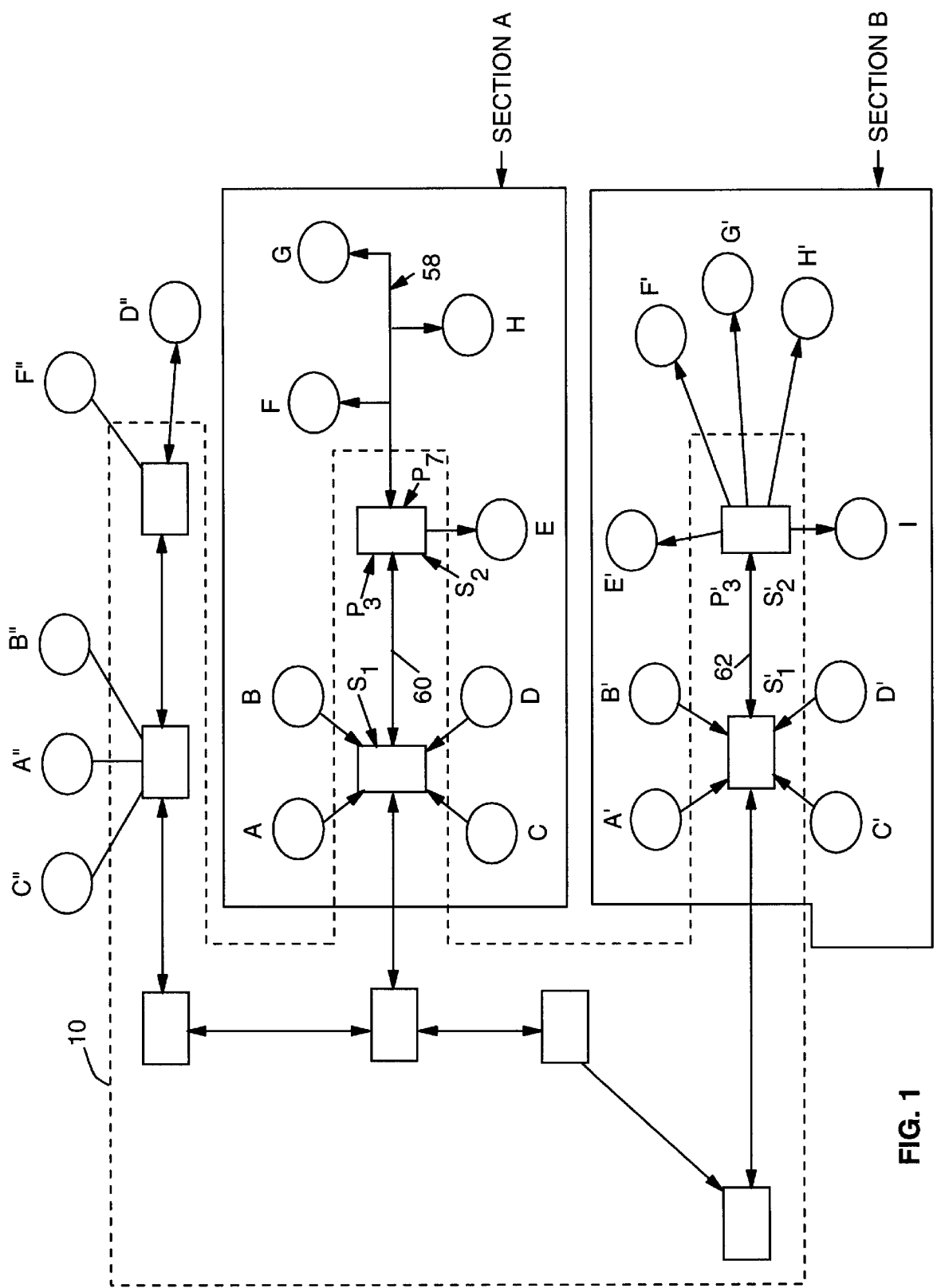
FIG. 1 shows a computer network embodying the teachings of the present invention.

FIG. 1 shows a schematic of a computer network in which the present invention can be implemented. This network is only an example and should not be construed as a limitation in any way on the scope of the present invention. The computer network includes a Communications Infrastructure 10 and a plurality of user nodes termed (Data Terminal Equipment, DTE) A, A', A", B, B', B", C, C', C", D, D', D", F, F', F", G, G', H, and H'. The DTEs are end user units and can be Personal Computers (PCs), word processing units or other types of end users devices. Each end unit is connected to the communications infrastructure by transmission medium. Any type of transmission medium such as wire, fiber optics, twisted pair or the like can be used to connect the end user's unit to the communications infrastructure. The Communication Infrastructure 10 includes a plurality of devices also called MAC control client interconnected by a plurality of communications links. The MAC controlled devices are shown with quadrilateral symbols. The transmission links interconnecting the quadrilateral symbols are primarily duplex links (FDX) transmitting data. The links may be manufactured from any of the well known materials such as wire, twisted pair, fiber optics or the like. Also, simplex link could be used to interconnect the MAC devices. The MAC control client or devices may include any of the well known devices including switches, bridges, hubs, routers, etc. For purposes of description, the network shown in FIG. 1 uses either a Carrier Sense Multiple Access with Collision Detect ($CSMA_x/CD$) or Full Duplex 802.3X and ethernet protocol to transmit data.

Figure 3:
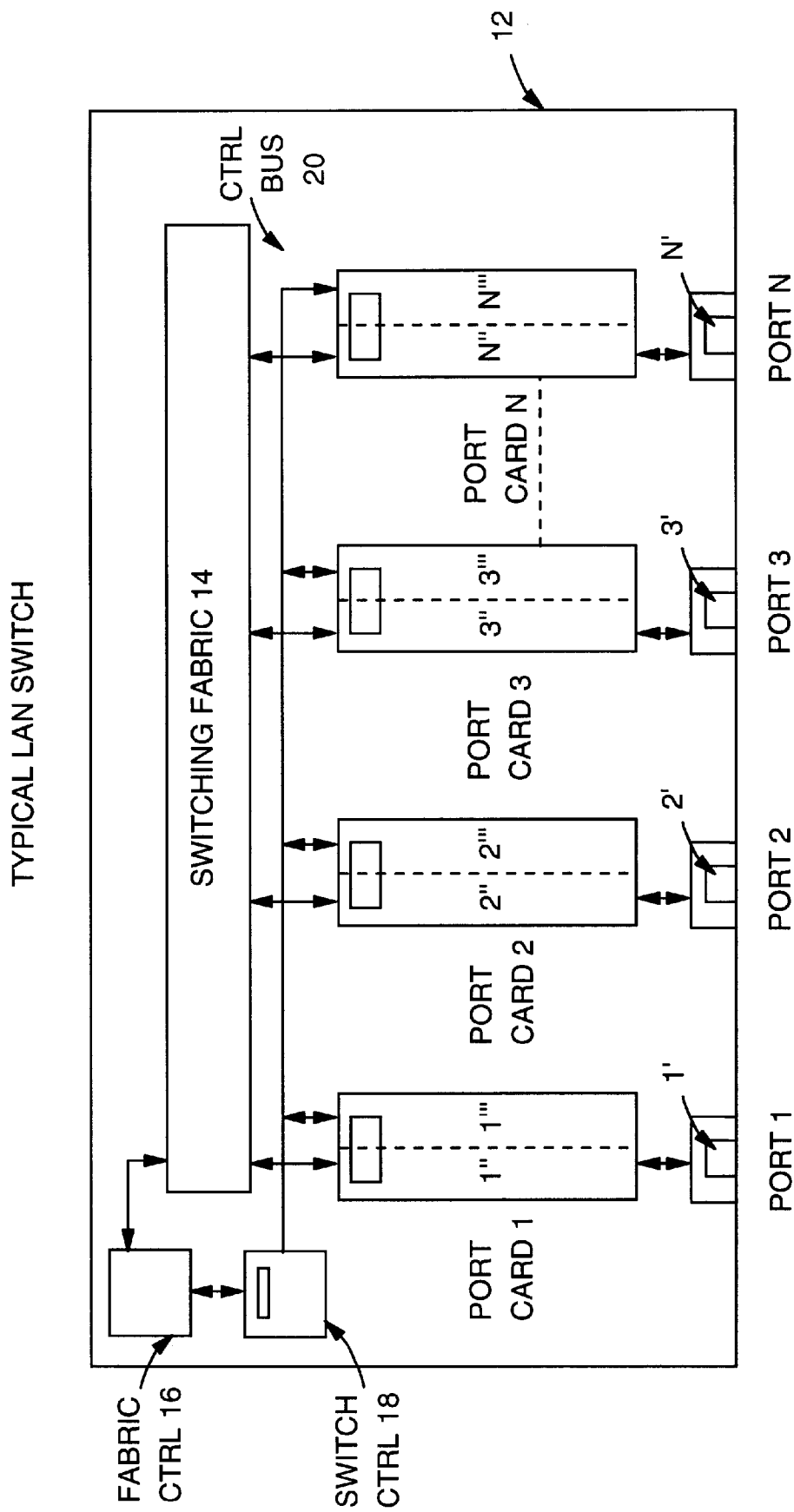
FIG. 3 shows a block diagram of a MAC device according to the teachings of the present invention.

FIG. 3 shows a block diagram of a switch embodying the teachings of the present invention and included as a MAC device in FIG. 1. The switch is comprised of Housing 12 to which a plurality of ports 1 through N are connected. Each port is fitted with a plug or receptacle 1' through N'. The receptacles provide the connection between the switch and respective data terminal equipment. Port Cards 1 through N connect ports 1 through N, respectively, to Switching Fabric 14. Each port card provides the facility for processing information from its associated port to the switching fabric and from the switching fabric to the port. The port cards, although they are shown as independent units, could be all implemented on a single card. The implementation of port cards are a matter of design choice and should not be a limiting factor in any way on the scope of the present invention.

Still referring to FIG. 3, the Switch Fabric 14 can be any of the well known cross point switches or could be as simple as a bus. Again, the Switch Fabric 14 is a matter of design choice and does not limit the scope of the present invention. The Switch Fabric 14 is controlled by a Switch Fabric Controller 16. The switch is controlled by a Switch Controller 18. In the preferred embodiment of this invention, the Switch Controller 18 is a microprocessor with Switch Control Bus 20 interconnecting the Switch Fabric Controller 16 and the port cards 1 through N. The flow control mechanism (details set forth below) of the present invention is implemented within the port cards and the switch controller and is shown by rectangular entities in each of the port cards and the Switch Controller 18. As stated previously, each of the port cards provides the processing function that allows data to move from a port to the switching fabric or the Switching Controller 18 and vice versa. To this end, each of the port cards has an Upview Section 1" through N" and a Downview Section 1'" through N'". The Upview Section processes data from the port to the switch and/or Switch Controller 18 while the Downview Section processes information from the switch or the Switch Controller 18 to the port cards.

As stated previously, the IEEE 802.3X (HDX/FDX) and ethernet protocols are used to shuttle information throughout the network. Basically, the protocols have an information frame which are used to transport information and Medium Access Control (MAC) Frames which are used primarily for network management. The present invention provides a Flow Control Mechanism which includes a Flow Control MAC Frame and devices in the switch for generating the Flow Control Frame according to the teachings of the present invention.

Figure 2:
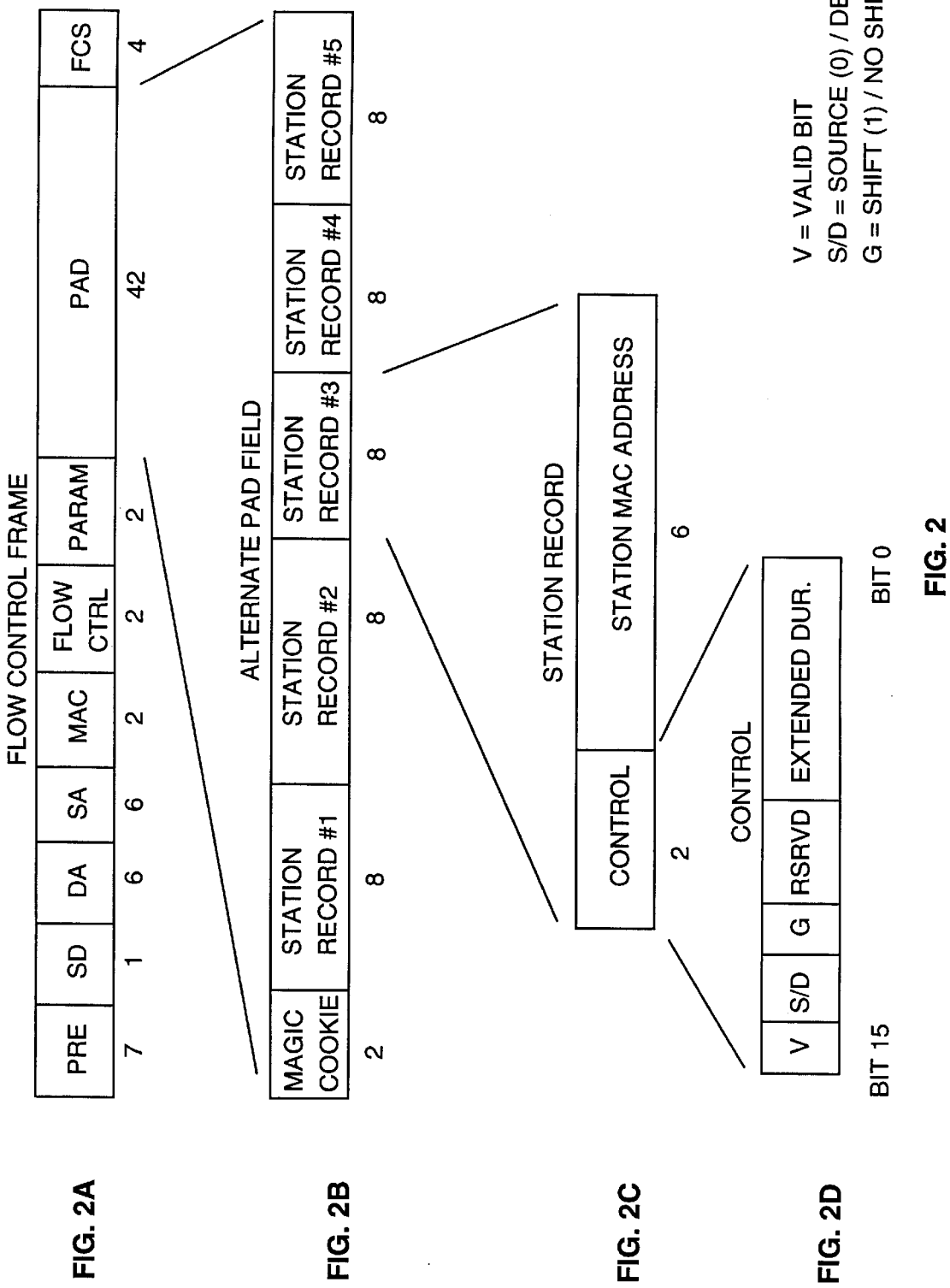
FIG. 2 shows a flow control frame according to the teachings of the present invention.

FIG. 2 shows the Flow Control MAC Frame according to the teachings of the present invention. The MAC Frame is generated in MAC devices such as switches, etc., and are transmitted to other MAC devices in the network or end user units. The recipient devices or units adjust their data outputs. As a consequence, the bandwidth on a congested link can be adjusted without terminating (pause) all data traffic on a congested link for a specified time period. In addition, depending on the bits set on the frame, a link can be completely shut down (pause). Therefore, the invention provides a comprehensive Flow Control Mechanism in which the link can be shut down completely (i.e., no data is being transmitted) or the bandwidth can be adjusted to allow the flow of data.

Still referring to FIG. 2, the Flow Control Frame, according to the teachings of the present invention, includes the following fields: Preamble (PRE), Starting Delimiter (SD), Destination Address (DA), Source Address (SA), MAC Control Opcode (MAC), Flow Control (Flow Ctrl), MAC Control Parameters (PARAM), Pad and Frame Check Sequence (FCS). The length of each field is shown in bytes below the abbreviation of the field (i.e., PRE Field=7 Bytes and so forth).

The preamble followed by the start delimiter are used to indicate the beginning of a frame transmission and to synchronize the clock signals between the transmitting and receiving stations on the media. The destination and source addresses indicate which stations should copy a frame and which station originated that frame. The MAC control opcode is used to indicate that this frame is intended to be handled by the MAC portion of the receiving station, and the flow control field indicates that this is a pause frame. The parameter field indicates how long the receiving station is being asked to pause. The pad field is used to comply with the 802.3X standard requirement for a minimum sized frame (64 bytes total). Finally, the frame check sequence field is used to verify the integrity of the data contained within the frame.

FIG. 2B shows the information carried in the Pad Field according to the teachings of the present invention. The Pad Field includes a Magic Cookie Field which carries information indicating whether or not this is a regular pad field (discussed above) or a special pad field. The special pad field contains information with regard to problem source and destination addresses. According to the teachings of the present invention, if the Magic Cookie Field does not contain a predefined constant value (0x7698) or some other notation, the rest of the pad field will not be processed. It should be noted that the value for the Magic Cookie Field is expressed in hexadecimal notation. Therefore, 0x7698 and 7698H represent the same value and are used interchangeably in this specification, with 0x7698 being Hex representation in C language.

The remainder of the Pad Field includes a plurality of station record fields. To make the frame the same size as a 802.3X frame, five station record fields each containing 8 bytes can be carried in the Pad Field. Of course, any number from zero to five (0–5), depending on the number of stations causing the congestion problem, can be fitted in the station record field.

FIG. 2C shows the details of each station record. The station record includes a control field in which control information is carried and a station MAC address field. Preferably, the control field is two bytes wide and the station MAC address is six bytes wide.

FIG. 2D shows the details of the control field. The control field includes a V bit whose setting indicates whether the information is valid or not. In the preferred embodiment of this invention, a logical 1 indicates valid information, and 0, not valid. The S/D Bit indicates whether the MAC address is a Source or a Destination. If a source, the bit is set to zero and the bit is set to 1, if a destination. Of course, these settings can be changed without deviating from the scope of the present invention. The G bit when set to 1 indicates a shift and if set for 0, is a no-shift. The Reserved (RSVRD) field carries a set of bites which are not used but are available for use in future expansion. The Extended Duration Field (DUR) carries a set of bits which indicate the period of time that the station is to be shut down. Usually, the period of time is given in slot times, and when running at a 100 Mbps, the range of time that a Station B to be shut down is from 0 to 336 Ms.

Having described the Flow Control Unit according to the teachings of the present invention, the mechanism used to detect a congestion state in the switch and generate the flow control in accordance with the present invention will now be described.

Figure 4:
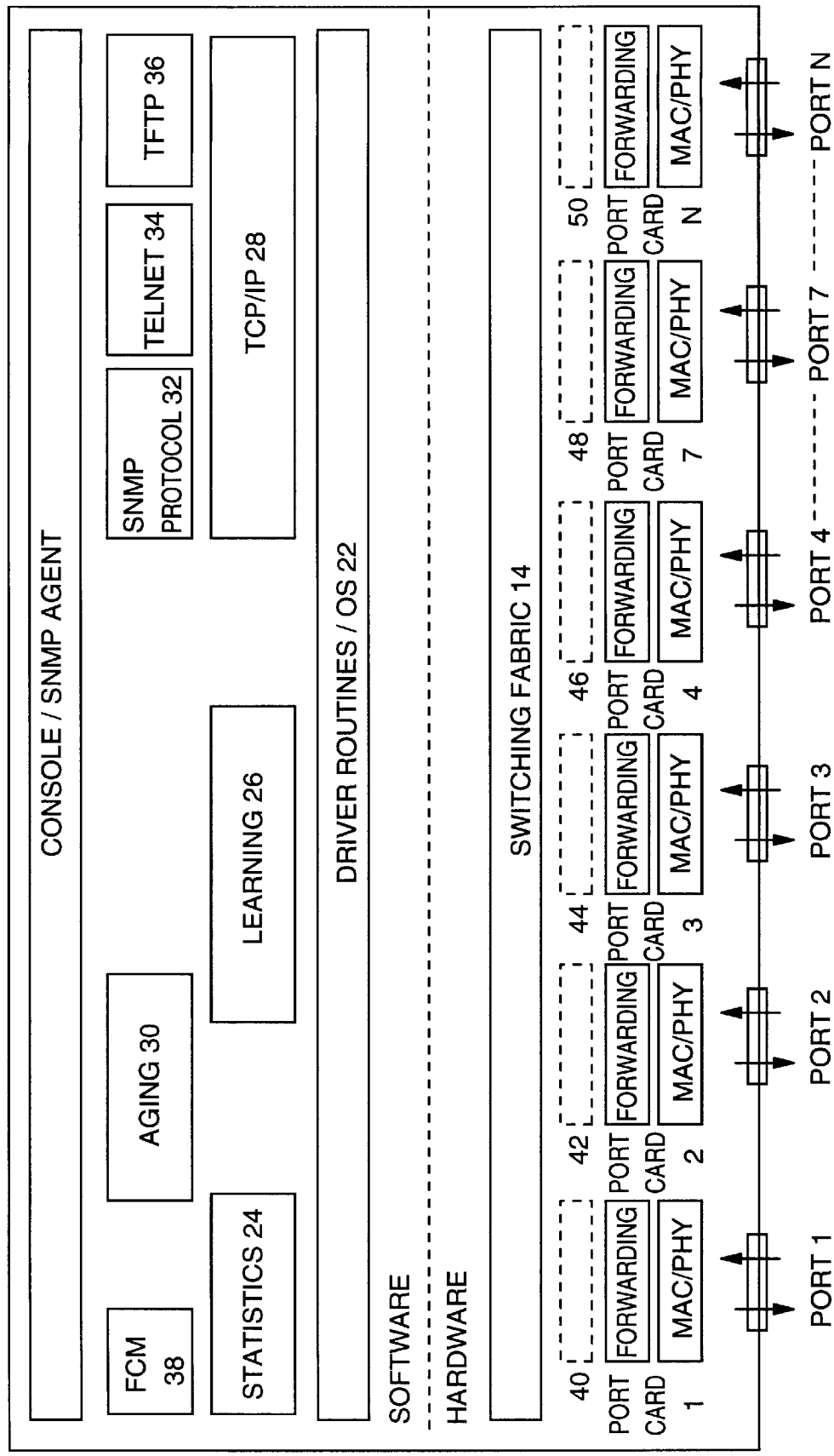
FIG. 4 shows a logical representation of the MAC device according to the teachings of the present invention.

FIG. 4 shows a more detailed functional representation of the typical LAN switch shown in FIG. 3. Functionally, the LAN switch includes a software portion and a hardware portion. The software portion includes a plurality of software modules or software functions running in the Switch Controller 18. It should be noted that in this embodiment, the Switch Controller 18 (FIG. 3) is deemed to be a microprocessor. The software portion includes a plurality of software modules or functions executable on the microprocessor. The software modular functions include Driver Routines/Operating System (OS) 22, Statistics 24, Learning 26, TCP/IP 28, Aging 30, SNMP Protocol 32, TelNet 34, TFTP 36 and Flow Control Mechanism (FCM) 38. The FCM 38 module is the software portion of the Flow Control Mechanism (details will be given subsequently) according to the teachings of the present invention. Even though the software functions, excluding FCM 38, are well known, for purposes of completion, a short description of each software module or function will be described.

The driver routines/operating system (OS) module 22 provides initialization and control of the switch hardware and provides scheduling and other services to the other software tasks. Statistics module 24 periodically polls the data structures within the individual ports and collects data regarding frames and bytes sent-to and received-from individual stations as well as the number of errors encountered, etc. Learning module 26 compounds data on the location of individual stations and configures other ports to be able to send frames for those station directly to their outbound port instead of flooding those frames to all the ports on the switch. TCP/IP module 28 provides higher layer networking protocols to allow the switch to communicate with management stations via its network ports. Aging module 30 determines when stations become inactive and removes inactive stations from the list of learned stations. SNMP protocol module 32 uses services provided by TCP/IP module 28 to communicate with management stations via the Simple Network Management Protocol. Telnet module 34 uses services provided by TCP/IP module 28 to communicate with management stations via a serial terminal-like interface. TFTP module 36 uses services provided by TCP/IP module 28 to download code images and configuration files at the direction of the management station.

Still referring to FIG. 4, the hardware portion of the switch includes Switching Fabric 14 and the plurality of Port Cards 1 through N. For consistency, the common elements in FIGS. 4 and 3 are identified with the same numerals. Each port card is connected to a port and the arrows associated with each port show the directions of data flow into and out of the switch. As can be seen from FIG. 4, each of the port cards have the same hardware structure; therefore, only one will be described. It should be understood that the description of one covers the description of the others. The implementation of the Flow Control Mechanism, according to the teachings of the present invention, includes the software portion identified as FCM 38 and hardware portions, positioned at each of the port cards and identified by numerals 40, 42, 44, 46, 48 and 50. In essence, portions of the Flow Control Mechanism is implemented at each port of the switch. It should be noted that this implementation is only an example and the basic teachings of the invention could be implemented otherwise without deviating from the scope or spirit of the present invention.

Still referring to FIG. 4, the port card, including the hardware portion of the Flow Control Mechanism are identical for each port; therefore, only one will now be described. It should also be noted that for the most part, the portion of the port card shown in FIG. 4 represents the upview section of the port card. The downview section would use the same MAC/physical (Phy) Module with probably minor changes in the forwarding portion. Each of the port cards includes a MAC/physical (Phy) module. The physical (Phy) portion of the module provides the front end functions which receives and forwards data to the LAN segment or device attached to the appropriate port. Included in the physical functions are phase locked loop for recovering data and clock signals from the LAN segment attached to the port, magnetics and termination circuit, etc. These front end components and functions are well known in the prior art and further description is not warranted. The MAC portion of the module performs the Medium Access Control function of the port. The Medium Access Control functions include formatting data to meet the protocol of the system, etc. Referring to FIG. 1, for the moment, a local area network (LAN) of the CSMA/CD or ethernet type is coupled to LAN Switch S2. With reference again to FIG. 4, that ethernet LAN would be connected to one of the ports of the switch and the MAC module would perform the ethernet protocol necessary to receive and forward data onto the port.

Referring again to FIG. 4, the forwarding portion of each module receives data from the MAC and forwards it through its associated hardware portion of the Flow Control Mechanism 40 through 50 to the Switch Fabric 14 and software Portion 38 of the Flow Control Mechanism. The function of the switching fabric has already been described and will not be repeated.

Figure 5:
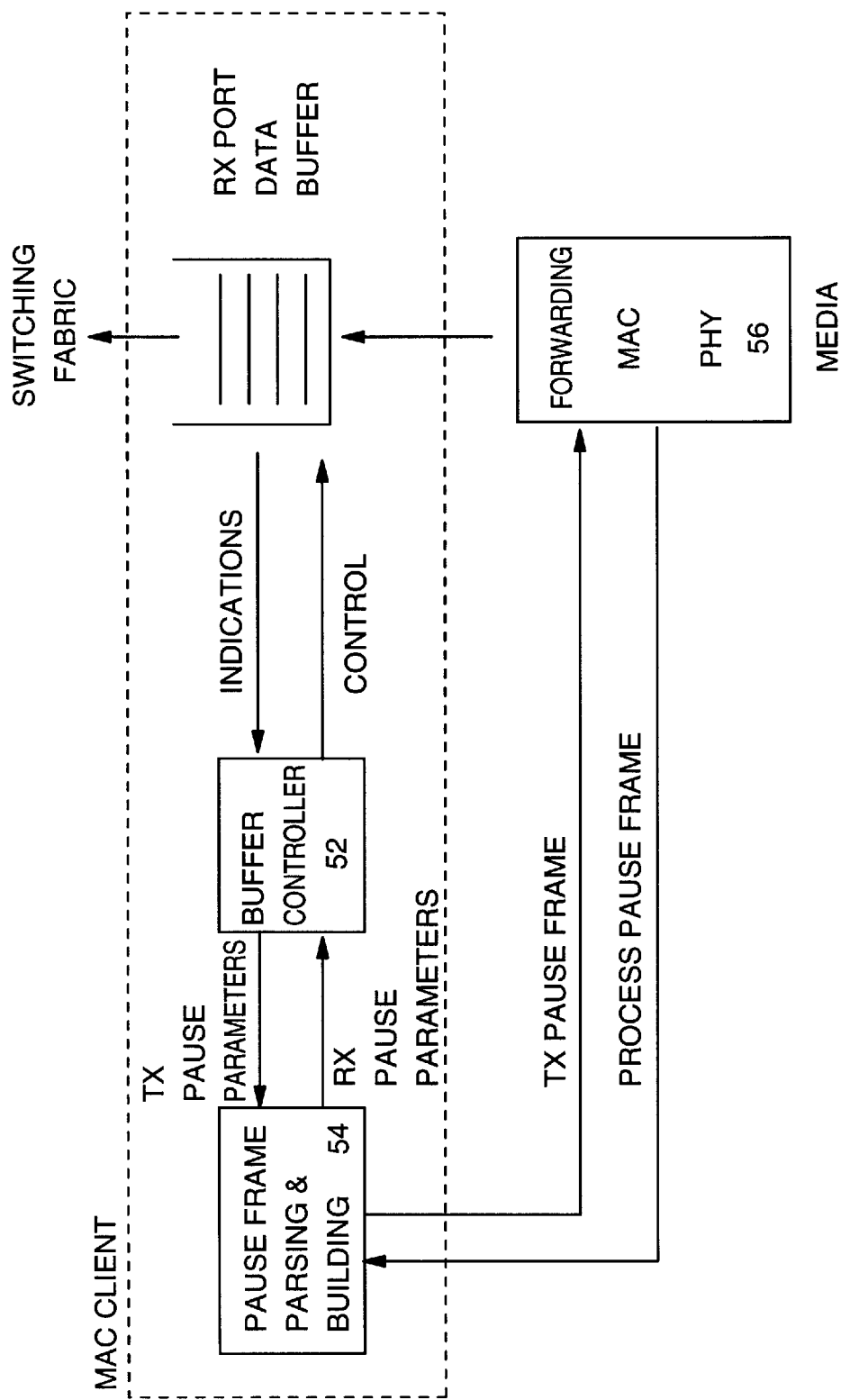
FIG. 5 shows an implementation of the invention.

FIG. 5 shows an implementation for the flow control mechanism according to the teachings of the present invention. The Flow Control Mechanism includes a MAC client which includes a software portion and a hardware portion. The hardware portion includes part of the buffer control which manages the Receive (RX) Port Data Buffer. The output from the Received Port Data Buffer is fed to the switching fabric previously discussed. The port data buffer is monitored by the buffer controller and generates information that is used for setting the parameters in the Flow Control Frame. The forwarding MAC/physical module is identical to those described in regards to FIG. 4. In addition, the showing in FIG. 5 is an upview from any one of the ports. The RX Port Data Buffer includes controls not shown which basically measure data rates and queue length (fullness of the buffer) and output information on a per source MAC Address on the Line Label Indications. The Buffer Controller 52 performs a buffer monitoring scheme and back-off time calculations, anticipate buffer overflows, trigger state change in buffer control time to send pause frame for starting or stopping either a link or some selected MAC sources.

In particular, the buffer controller 52 (preferable hardware implementation) maintains two lists (or pools) of buffers available for use by a port. One list is for use in receiving frames in from a port and the other list is for use in transmitting frames out of a port. The buffer controller 52 is responsible for allocating buffers and keeping track of which and how many buffers are currently in use or available for transmitting and receiving at any given time. The buffer controller hardware is configurable with high-water marks indicating that when a certain amount of used buffers is reached or exceeded on either the input or output channel; then, a state is entered which triggers an indication to the switch control point that the buffer pool is in danger of being overflowed. The buffer controller might also be implemented in such a way as to allow it to statistically predict whether or not a buffer pool overflow is likely to occur and only trigger an indication if a likelihood exists of a buffer pool overflow.

The buffer controller 52 performs several traffic control activities: it measures buffer dynamics/activity so that high-water marks can be set for identified traffic flows (those defined to be significant enough for individual flow-control actions); it identifies the traffic flows that contribute significant traffic and therefore should be individual flow-controlled; it determined the high-water marks for use in the buffer elements; and it determines the appropriate pause times that are to be formatted and sent by the Pause Frame Parsing and Building Mechanism 54, also called Pause Frame Building (54).

In order to establish the high-water marks used by the buffer elements, the buffer controller 52 measures buffer dynamics/activity during system operation. The measurements would include, but are not limited to, items such as the average buffer usage and the variance in buffer usage over time. Measurements may be gathered per identified traffic source feeding the buffer. The buffer controller also monitors traffic and identifies the significant traffic flows.

The buffer controller determined the high-water marks for identified traffic flows and also determines the pause times appropriate for flow-controlling traffic sources. It does these two functions using a statistical model of buffer behavior. The buffer controller can, as a result, attempt to anticipate and control buffer overflow losses. The statistical model uses real-time measurements gathered by the buffer controller. As system operation proceeds, the buffer controller monitors buffer operation (by gathering measurements of buffer behavior) and adjusts high-water marks as needed. When a high-water mark is exceeded on a given traffic flow, the buffer controller formulates an appropriate pause time and sends this to the pause frame builder 54. In addition, the buffer controller monitors flow traffic and may adjust the list of flows being monitored (so that limited system resources are not expended on idle flows).

The Pause Frame Parsing and Building Mechanism 54 includes both hardware and software and generates the flow control frame and inserts the various parameters presented from the buffer controller on the line labeled TX Pause Parameters. When a frame is formulated, the frame is sent on the line labeled Transmit (TX) Pause Frame to the forwarding MAC/Physical Port Card 56. Pause Frames which are received from the network by Forwarding MAC Physical Port Card 56 are transported on the line labeled Process Pause Frame to Pause Frame Parsing and Building Device 54 and are paused according to the information in the frame.

The pause frame parsing and building block 54 is responsible for creating pause frames to be transmitted and for acting on pause frames that are received. When a pause frame is received the pause frame parsing hardware first acts on the 802.3X pause information regarding the entire link and disables the link for the appropriate amount of time. The pause frame parsing hardware then checks the magic cookie field to see if it matches our magic cookie value (0x7698) or some other predetermined value. If the value matches, the pause frame parsing hardware triggers an indication to the switch control point that an extended flow control frame has been received. At this point, the pause frame parsing software will parse each of the station records and act to block traffic to the port receiving the pause frame either from problem sources or to problem destinations either by forwarding the pause frame (or transmitting a new pause frame) to full-duplex connections or by modifying port forwarding tables for half-duplex connections. Of course, other types of action could be taken without departing from the scope or spirit of the present invention.

The pause frame building software runs in response to an indication from the buffer controller that a buffer pool is in danger of overflowing. The pause frame building software then formulates a pause frame with an appropriate parameter value and records for the top offending stations. After formulating the pause frame the pause frame building software transmits the pause frame out the port whose buffer controller had generated the indication (in the case of a receive buffer overflow) or out all the ports sending traffic to the port that had generated the indication (in the case of a transmit buffer overflow).

As an aid to further understand the invention, examples of congestion scenarios and how the present invention can be used to relieve the congestion will now be given. Turning to FIG. 1, for the moment, Section A of the network will be used to describe the first example. In this example, Stations A, B, C and D are each attached to Switch S1 via dedicated links. Station E is attached to Switch S2 via a dedicated link. Stations F, G and H are attached to Switch S2 via a 10 Mbps Shared Link 58. For purposes of this discussion, it is assumed that Station D is generating 4 Mbps worth of traffic which travels through S1, across the Link 60 to S2 and out of the port to which the Station E is attached. Similarly, Stations A, B and C are each generating 4 Mbps worth of traffic (destined for Stations F, G and H, respectively) which travels through S1 across the Link 60 to S2 and out Port 7 to which Stations F, G and H are attached. However, this traffic flow over Link 60 causes the 10 Mbps of available bandwidth on Port P7 to be over-subscribed. Since neither F, G nor H will be experiencing buffer overruns, no flow control frames will be received inbound to P7. Therefore, S2 must either randomly drop the frame destined for P7 or send a flow control frame in accordance with the teachings of the present invention described above, out of Port P3 since P3 is the source port of all traffic flowing through S2. Preferably, it would be better not to drop frames if at all possible.

However, due to the nature of link-by-link flow control, sending a Flow Control (Pause) Frame out of P3 would stop not only pause traffic destined for the over-subscribed P7 Port, but also for the under-subscribed link to Station E. Clearly, it would be more desirable to stop the flow of traffic from one or more individual stations than it is to stop the flow of all traffic on a given port. To this end, an end-to-end (or middle-to-end) Flow Control Mechanism (according to the teachings of the present invention) would allow S2 to transmit a Flow Control Frame from P3 that would identify A, B and/or C as the user's saturating P7. This would give S1 the information necessary to pause the flow of traffic from A, B and C while allowing traffic from D to continue to flow across the link from S1 to S2.

A second scenario is described with reference to Section B of the network shown in FIG. 1. In the second scenario, Stations A', B', C' and D' are directly attached to Station S1'. Stations E', F', G', H' and I are directly attached to Switch S2'. Stations B', C' and D' are each generating 20 Mbps of traffic destined for Stations I, E' and F', respectively. Station A' is generating 20 Mbps of traffic destined for Station G' and 20 Mbps of traffic destined for Station H', for a total of 40 Mbps. All of the traffic from Station A40 , B', C' and D' travels through S1' to S2' across a fully saturated 100 Mbps link (identified by numeral 62), in Section B, (FIG. 1). In this situation, it is likely (especially if the port is operating in store and forward mode) that Port P3' would transmit a Flow Control Frame (according to the teachings of the present invention). With a link-by-link flow control mechanism, this would result in temporarily stopping all of the traffic from S1' to S2'. However, an end-to-end (or middle-to-end) mechanism would allow S2' to transmit a Flow Control Frame according to the teachings of the present invention from P3' that would identify Station A' as the primary user saturating the Link 62. This would give S1' the information necessary to pause the flow of traffic from Station A' while continuing to allow traffic to flow from B', C' and D' across link 62 to S2'.

The third scenario is described with reference to Section A, FIG. 1. In this example, Stations A, B, C and D are attached to Switch S1 via dedicated links. Stations G and F are attached to Switch 2 via the 10 Mbps shared link 58. It should be noted that in the third example, Stations E and H are not discussed. Still referring to Section A, FIG. 1, Stations A, B and C are generating 3 Mbps worth of traffic destined for Station F and D is generating 3 Mbps worth of traffic destined for Station G. As in a previous example, this causes the bandwidth in the output port P7 to be over-subscribed while the input port P3 is under-subscribed. In this case, there is no one source for the majority of the traffic on P7. However, Station F is a destination for the majority of that traffic. Therefore, it should be clear that the end-to-end (or middle-to-end) flow control mechanism of the present invention needs to provide a mechanism for identifying problem destination as well as problem sources. This would allow S2 to transmit a Flow Control Frame (according to the teachings of the present invention) from P3 that would inform S1 to pause the flow of traffic to Station F (from A, B or C) without affecting the flow of traffic to Station G from Station D.

A fourth scenario is described with reference to Section B, FIG. 1. In this example, Stations A', B' and C' are connected with dedicated links to S'1. A 10 Mbps duplex (FDX) Link 62 connects S1' to S2'. Station A' and B' are each generating 3 Mbps of traffic destined for Station I. Under these conditions, the bandwidth and Port P3' is at saturation and it is likely that the input buffers on Port P3 will fill up, forcing S2' to send a flow control frame out to Port P'3 to Switch S'1. The mechanism of identifying problem destinations, in this situation, according of the teachings of the present invention would be more effective than a link-by-link mechanism since no one station is the source of most of the traffic on the Link 62 which is an inter-switch link. However, by identifying E' as a problem destination, S'2 can give S'1 the information necessary to pause traffic destined for Station E' (from A' and B') while continuing to allow the flow of traffic to G' (from C'). This concludes the description of the invention.

Figure 6:
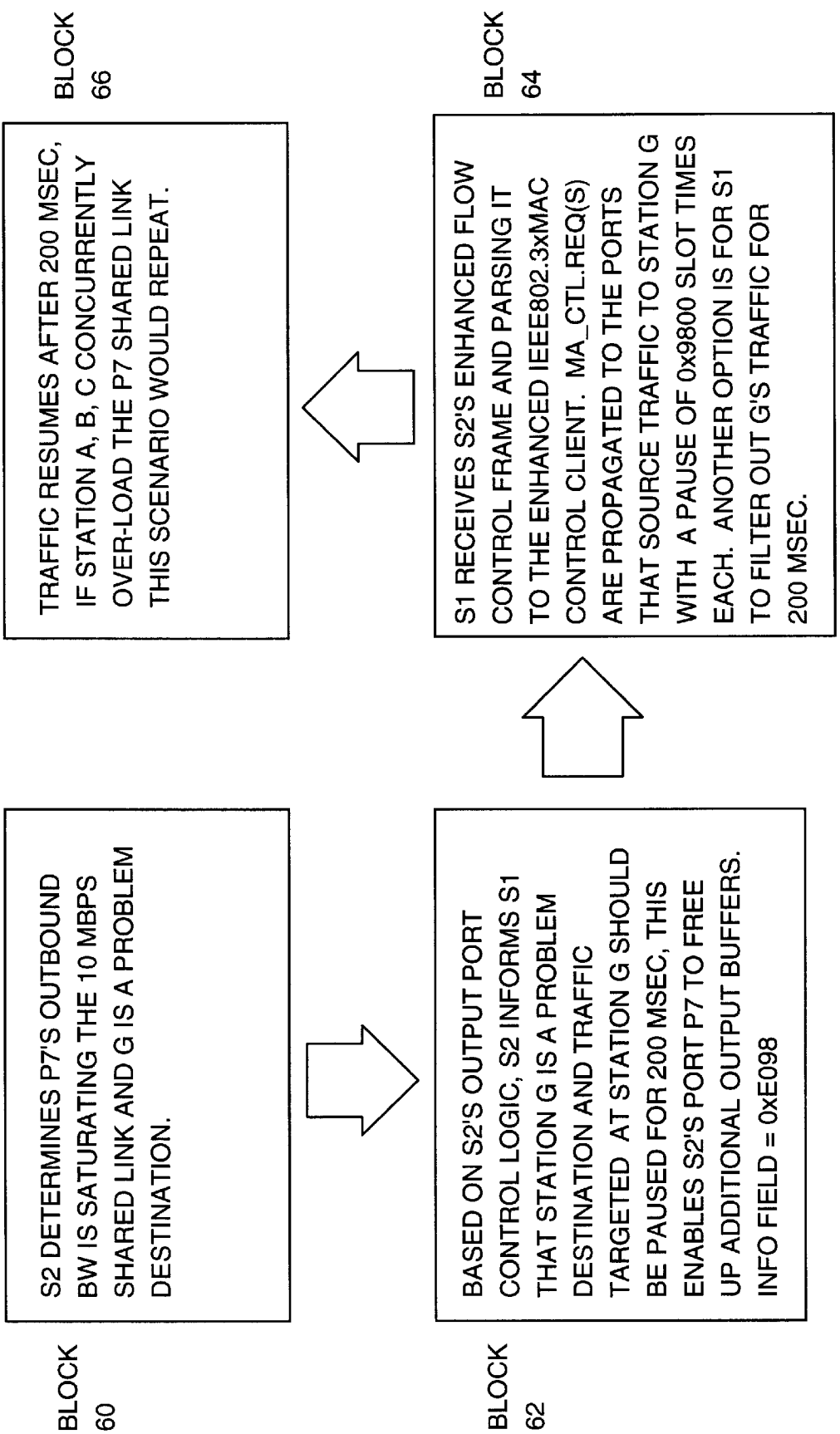
FIG. 6 is an example of a flowchart for managing congestion according to the teachings of the present invention.

FIG. 6 shows an example of a flowchart of processing steps for managing congestion caused by the third scenario above. The teachings can be extended to cover the others or any congestion within a data network. In Block 60, Switch S2 (FIG. 1) determines Port P7 (FIG. 1) outbound bandwidth (BW) is saturating link 58 (FIG. 1). The determination is made according to the teachings of the present invention set forth herein.

The process then enters Block 62 where, among other things set forth in the block, S2 sends an enhanced Pause Frame according to the teachings of the present invention to Switch S1 requesting S1 to pause traffic designated for G for a particular period of time, say 200 msecs.

The process then enters Block 64 whereat, among other processes set forth in the block, pause frames are sent to stations sourcing data to G. The process then enters Block 66 whereat traffic is resumed or the process starts over.

Several benefits ensure to the user of the present invention. The benefits include the ability to back down a congested link bandwidth to an acceptable level that allows traffic to continue to flow.

The invention allows end-to-end or middle-to-end flow control by identifying the source/destination causing the congestion. The invention uses the Pad Field presently defined in MAC ethernet frame to carry useful information about the congestor and the congestee.

The invention is inter-operable with the IEEE 802.3X standard defining a frame for use in a Link-to-link Flow Control.

The invention provides a Robust Flow Control Mechanism that allows total shut down on the link or bandwidth reduction on the link.

While the invention has been particularly shown and described with reference to the particular embodiment thereof, it will be understood by those skilled in the art that various changes in form and detail may be made therein without departing from the spirit and scope of the invention.

Having thus described our invention, what we claim and desire to secure as letters patent is as follows:

1. A device for use in a communications network including:
   a housing;
   at least two I/O ports connected to the housing;
   a switching fabric;
   at least one I/O port card operatively coupling the I/O ports to the switching fabric, wherein said at least one I/O port card including logical and electrical circuits for processing frames received from a designated port or to be transmitted to said designated port; and
   a Medium Access Controller (MAC) including logical/electrical circuit arrangements generating at least one flow control frame to be used to adjust bandwidth on a link into said device, said at least one flow control frame including a Magic Cookie Field containing information indicating at least one station record field containing information identifying at least one entity causing congestion.

2. The device of claim 1 wherein the at least one I/O port card includes transceivers with transmitters forwarding the Flow Control Frame onto the link.

3. The device of claims 1 or 2 wherein the at least one I/O port card further includes receivers receiving incoming Flow Control Frames including a Magic Cookie Field containing information specifying the presence or absence of at least one station record field containing data identifying entities causing the congestion.

4. The device of claim 3 wherein the controller further including logical/electrical circuit arrangements being responsive to the incoming flow control frames to examine the Magic Cookie control field and depending on the information therein, parse or not parse a PAD Field containing the at least one Station Record field.

5. The device of claim 4 further including means, responsive to electrical signals identifying a station causing congestion, to output from the logical/electrical circuit arrangement a frame indicating appropriate action to limit data output from said station.

6. A flow control method for use in a network including a communications infrastructure coupling a plurality of Data Terminal Equipments (DTEs) said flow control method including the steps of:
   (a) generating, in a network entity, a Flow Control Frame including a Magic Cookie Field in which information specifying the presence or absence of Station Record Fields is to be placed and Station Record Field for carrying information specifying stations causing congestion;
   (b) monitoring in said network entity to detect congestion; and
   (c) inserting, in said flow control frame, appropriate information if congestion is detected.

7. The method of claim 6 further including the step of transmitting the frame.

8. The method of claim 7 wherein each of the Station Record Fields includes a control field carrying control information and a station identity field carrying a station MAC address.

9. The method of claim wherein the control field further includes a Validity (V) bit;
   Source/Destination (S/D) bit indicating the entity causing the congestion, a G bit indicating shift or no shift, a set of Reserved (RSVRD) bits and a set of bits indicating a period for which a device is to be shut down.

10. The method of claim 7 further including the steps of receiving the Flow Control Frame from another network entity;
    examining the Magic Cookie Field;
    if information in the Magic Cookie Field indicates the presence of Station Record Fields, parsing said Station Record Fields to determine the identity of network entities causing the congestion; and
    lowering data output from said network entities to a level below maximum data output.

11. The method of claim 7 further including the steps of receiving from another network entity the flow control frame;
    examining the Magic Cookie Field;
    if the information indicates the presence of Station Records Field in said message, parsing the message and detecting the identity of network entities causing congestion; and
    adjusting data output from detected network entities.

12. The method of claim 6 wherein the generating step further includes the steps of generating a Control Parameter field in which information specifying Pause time for a congested link is to be placed.

13. The method of claim 12 further including the steps of receiving the Flow Control frame from another network entity;
    parsing the flow Control Frame;
    if the Magic Cookie Field is set to a value indicating no station record fields, examining the Parameter Field; and
    pausing a link for a time interval set forth in said Parameter Field.

14. A flow control mechanism for use in a data network including a communications infrastructure coupling a plurality of Data Terminal Equipment (DTE), said flow control mechanism including:

a circuit arrangement for detecting congestion within said data network; and a controller being responsive to the detection generating a Flow Control Frame including a PAD Field containing a Magic Cookie subfield and an identity of at least one network entity causing the congestion.

15. The Flow Control Mechanism of claim 14 wherein the controller includes a processor being controlled by a program.

16. The Flow Control Mechanism of claim 14 further including a second circuit arrangement for receiving the Flow Control Frame from another network entity; and said controller parsing the Received Flow Control Frame to detect an identity of network entities causing congestion.

17. A flow control method for use in a communications network including the steps of:

(a) receiving a frame from a network device;

(b) examining the frame;

(c) if a field in the frame is set to a first predetermined value, accessing predetermined subfields in said frame;

(d) extracting, from said predetermined subfields, information including identity of network devices and pause times for which at least one of the network devices is to be shut down; and (e) using the information to shut down the device.

18. The method of claim 17 further including the steps of if the field in step (a) is set to a second predetermined value, examining another field in the frame; and shutting down a link in said network for a time interval specified in said another field.

19. The method of claim 17 wherein the first predetermined value includes 7698H.

20. A mechanism to manage data flow in a CSMA/CD or ethernet network including a Medium Access Controller (MAC) generating a flow control frame including a PAD Field having a first subfield in which information specifying the presence of other subfields is to be placed and at least one of the other subfields specifying network entities causing congestion; and a transmitter transmitting the flow control frame.

21. The mechanism of claim 20 wherein the information in said first subfield indicates the absence of other subfields.

22. The mechanism of claims 20 or 21 further including a Parameter Field in which a value indicating a pause time for a link is to be inserted.

23. The mechanism of claim 20 further including the other fields mandated by IEEE802.3 standard.

24. A method for managing flow in a CSMA/CD or ethernet network said method including the acts of receiving in a network entity a MAC frame;

parsing the MAC frame;

if a predetermined value is detected in a particular subfield of said MAC frame, extracting at least one address of a network entity causing congestion; and generating and forwarding another MAC frame to the entity causing the congestion.

* * * * *